United States Patent
Furmaniak et al.

(10) Patent No.: US 7,801,358 B2
(45) Date of Patent: Sep. 21, 2010

(54) METHODS AND SYSTEMS FOR ANALYZING DATA IN MEDIA MATERIAL HAVING LAYOUT

(75) Inventors: Ralph Furmaniak, London (CA); Ray Smith, Mountain View, CA (US); Luc Vincent, Palo Alto, CA (US); Dan Bloomberg, Mountain View, CA (US); Dar-Shyang Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 511 days.

(21) Appl. No.: 11/592,268

(22) Filed: Nov. 3, 2006

(65) Prior Publication Data

US 2008/0107337 A1    May 8, 2008

(51) Int. Cl.
*G06K 9/34* (2006.01)
(52) U.S. Cl. .................. 382/180; 382/173; 382/176
(58) Field of Classification Search ........... 382/173, 382/176, 180; 358/462
See application file for complete search history.

(56) References Cited

U.S. PATENT DOCUMENTS

| | | | |
|---|---|---|---|
| 5,335,290 A | | 8/1994 | Cullen et al. |
| 5,805,731 A | * | 9/1998 | Yaeger et al. ............... 382/228 |
| 5,848,184 A | * | 12/1998 | Taylor et al. ................ 382/173 |
| 5,848,186 A | * | 12/1998 | Wang et al. .................. 382/176 |
| 6,173,073 B1 | * | 1/2001 | Wang ........................ 382/176 |
| 6,577,763 B2 | * | 6/2003 | Fujimoto et al. ............. 382/199 |
| 7,382,909 B1 | * | 6/2008 | Nattkemper et al. ......... 382/133 |
| 2001/0018685 A1 | * | 8/2001 | Saito et al. ..................... 707/3 |
| 2003/0229854 A1 | | 12/2003 | Lemay |
| 2004/0122811 A1 | | 6/2004 | Page |
| 2004/0208371 A1 | * | 10/2004 | Liu et al. .................... 382/173 |
| 2006/0080309 A1 | | 4/2006 | Yacoub et al. |
| 2006/0184525 A1 | | 8/2006 | Jones et al. |
| 2007/0050406 A1 | * | 3/2007 | Byers ....................... 707/104.1 |
| 2007/0174343 A1 | * | 7/2007 | Fortuna .................... 707/104.1 |
| 2007/0291288 A1 | * | 12/2007 | Campbell et al. ............. 358/1.9 |
| 2008/0103996 A1 | * | 5/2008 | Forman et al. ................ 706/12 |
| 2008/0109425 A1 | * | 5/2008 | Yih et al. ....................... 707/5 |

OTHER PUBLICATIONS

Brants et al. ("Topic-Based Document Segmentation with Probabilistic Latent Semantic Analysis," CIKM'02, ACM, Nov. 4-9, 2002, pp. 211-218; submitted as part of the IDS).*

Breuel, Thomas, "Google Library Project", 2006 IUPR Research Group, last viewed Oct. 20, 2006, http://www.iupr.org/current/google_library_project_2, 3 pgs.

(Continued)

*Primary Examiner*—Yubin Hung
(74) *Attorney, Agent, or Firm*—Sterne, Kessler, Goldstein & Fox P.L.L.C.

(57) ABSTRACT

The present invention relates to systems and methods for analyzing media material having a layout. A media material analyzer includes a segmenter and an article composer. The segmenter identifies block segments associated with columnar body text in the media material. The article composer determines which of the identified block segments belong to one or more articles in the media material. The article composer can determine whether candidate block segments belong to a same article based on language statistics information, layout transition information, or both language statistics information and layout transition information. A system for searching media material having a layout over a network is also provided.

33 Claims, 18 Drawing Sheets
(5 of 18 Drawing Sheet(s) Filed in Color)

OTHER PUBLICATIONS

Mantzaris, S. L. et al., "Linking Article Parts for the Creation of a Newspaper Digital Library", Lambrakis Press S.A., 2000, 14 pgs.

Gatos, B. et al., "Automatic page analysis for the creation of a digital library from newspaper archives", 2000 Springer-Verlag, pp. 77-84.

Mitchell, Phillip E. et al., "Newspaper layout analysis incorporation connected component separation", Image and Vision Computing 22, 2004, pp. 307-317.

Cattoni, R. et al., "Geometric Layout Analysis Techniques for Document Image Understanding: a Review", ITC-IRST, Jan. 1998, 68 pgs.

Alam, Hassan et al., "Web Document Analysis: How can Natural Language Processing Help in Determining Correct Content Flow?", BCL Technologies Inc., 2003, pp. 29-32.

Koivusaari, Maija et al., "Automated document content characterization for a multimedia document retrieval system", Proc. SPIE 1997, vol. 3229, Oct. 1997, pp. 148-159.

Nicholas, Journet et al., "Ancient Printed Documents indexation: a new approach", Springer Berlin / Heidelberg, 2005, vol. 3686, pp. 580-589.

Malerba, Donato et al., "Adaptive Layout Analysis of Document Images", Dipartimento di Informatica, Universita degli Studi di Bari, 2002, 9 pgs.

Breuel, Thomas M., "High Performance Document Layout Analysis", 2003 Symposium on Document Image Understanding (SDIUT '03), Apr. 9-11, 2003, 10 pgs.

Klink, Stefan et al., "Document Structure Analysis Based on Layout and Textual Features", In Proc. of Fourth IAPR International Workshop on Document Analysis Systems, DAS2000, pp. 99-111.

Mao, Song et al., "Document Structure Analysis Algorithms: A Literature Survey", Center for Automation Research and IBM Almaden Research Center, 2003, 11 pgs.

Tsujimoto, Shuichi et al., "Understanding Multi-articled Documents", IEEE, May 1990, pp. 551-556.

Andersen, Tim et al., "Features for Neural Net Based Region Identification of Newspaper Documents", IEEE, Jan. 2003, 5 pgs.

Mühlberger, Günter, "Digitisation of Newspaper Clippings: The Laurin Project", RLG DigiNews, Dec. 15, 1999, vol. 3, No. 6, 21 pgs.

Shafait, Faisal et al., "Performance Comparison of Six Algorithms for Page Segmentation", Springer-Verlag, 2006, vol. 3872, pp. 368-379.

Mitchell, Phillip et al., "Newspaper Document Analysis featuring Connected Line Segmentation", Australian Computer Society, Inc, 2002, 5 pgs.

Brants, Thorsten et al., "Topic-Based Document Segmentation with Probabilistic Latent Semantic Analysis", CIKM'02, ACM, Nov. 4-9, 2002, pp. 211-218.

Nagy, George, et al., "A Prototype Document Image Analysis System for Technical Journals", IEEE, Jul. 1992, pp. 10-22.

O'Gorman, Lawrence, "The Document Spectrum for Page Layout Analysis", IEEE Transactions on Pattern Analysis and Machine Intelligence, vol. 15, No. 11, Nov. 1993, pp. 1162-1173.

Wong, K. Y., "Document Analysis System", International Business Machines Corporation, vol. 26, No. 6, pp. 647-656.

Breuel, Thomas M., "Two Geometric Algorithms for Layout Analysis", Document Analysis Systems, Xerox Palo Alto Research Center, 2002, 12 pgs.

Breuel, Thomas M., "Robust Least Square Baseline Finding using a Branch and Bound Algorithm", Document Recognition & Retrieval, SPIE, 2002, pp. 20-27.

Kise, Koichi, et al., "Segmentation of Page Images Using the Area Voronoi Diagram", Computer Vision and Image Understanding, vol. 70, No. 3, Jun. 1998, pp. 370-382.

Baird, Henry, "Background Structure in Document Images", International Journal of Pattern Recognition and Artificial Intelligence, vol. 8, No. 5, Oct. 1994, pp. 1013-1030.

International Search Report, dated May 14, 2008, for PCT Patent Application No. PCT/US/23233, 1 page.

* cited by examiner

Page 1 – Final Decision Tree Example

Page 14 – Final Decision Tree Example

Page 1 – Pure Language Statistics Example

Page 14 – Pure Language Statistics Example

METHODS AND SYSTEMS FOR ANALYZING DATA IN MEDIA MATERIAL HAVING LAYOUT

BACKGROUND OF THE INVENTION

1. Field of the Invention

The present invention relates to computer-aided analysis of media material.

2. Related Art

Computers are increasingly being used to perform or aid analysis of documents and printed material. Layout analysis techniques and systems have been used to analyze the location and relative arrangement of text and images in a document. Such document layout analysis can be important in many document imaging applications. For example, document layout analysis can be used as part of layout-based document retrieval, text extract using optical character recognition, reflowing documents, and conversion of document images into electronic form. Document layout analysis generally works best on simple documents, such as a business letter or single column report, and can be difficult or even unworkable when layouts are complex or variable. For instance, automated or semi-automated document layout analysis often fails on complex layouts and resort must be made to manual analysis of layouts.

Media material having columns of body text arranged in a layout create special challenges to document layout analysis. For example, newspaper layouts are generally very complicated, combining many articles and logical elements closely together on a page. Figuring out the structure of a newspaper is naturally done by humans with article context, pattern matching, and possibly newspaper style: elements that are more natural for humans than computers. Automated methods have generally relied mostly on graphical or geometric features alone, and hence make many mistakes, as there is no consistent set of simple rules that works across all newspapers.

What is needed are improved systems and methods for analyzing media material having a layout.

SUMMARY OF THE INVENTION

The present invention relates to systems and methods for analyzing media material having a layout.

In an embodiment, a media material analyzer may include a segmenter and an article composer. The segmenter identifies block segments associated with columnar body text in the media material. In one example, a segmenter analyzes pixel data in image data to identify regions having similar pixel value change complexity. Pixel value changes are identified along horizontal and vertical directions from a pixel. The article composer determines which of the identified block segments belong to one or more articles in the media material. The article composer can determine whether candidate block segments belong to a same article based on language statistics information, layout transition information, or both language statistics information and layout transition information.

In another embodiment, the article composer may include a language statistics analyzer. The language statistics analyzer determines which block segments output from a segmenter belong to one or more articles in the media material based on language statistics information. In particular, the language statistics analyzer calculates language statistics for candidate block segments output by the segmenter, and determines probabilities that candidate block segments belong to a same article based on an overlap in language statistics information.

In a further embodiment, the article composer may include a layout transition analyzer. The layout transition analyzer analyzes layout transition features in candidate block segments output by the segmenter and determines whether the candidate block segments belong to a same article in the media material based layout transition analyzer. In one example, the layout transition features include vertical and horizontal transition features.

In accordance with one aspect of the invention, a computer-implemented method analyzes data representative of media material having a layout. The method may include identifying block segments associated with columnar body text in the media material, and determining which of the identified block segments belong to one or more articles in the media material based on language statistics information and layout information.

In a further embodiment, a system for searching media material having a layout through a browser over a network, such as over the Web, is provided. A browser may receive text from one or more block segments in the same article identified in fulfilling a search request.

Further embodiments, features, and advantages of the invention, as well as the structure and operation of the various embodiments of the invention are described in detail below with reference to accompanying drawings.

BRIEF DESCRIPTION OF THE FIGURES

The patent or application file contains at least one drawing executed in color. Copies of this patent or patent application publication with color drawing(s) will be provided by the Office upon request and payment of the necessary fee.

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 7A shows a method for operating in training mode to determine vertical transition features. FIG. 7B shows a method for operating in training mode based on horizontal transition features.

FIG. 9A shows the run mode operation based on vertical transition features in a media material layout. FIG. 9B shows run mode operation based on horizontal transition features in a layout.

TABLE OF CONTENTS

Overview
Media Material Analyzer
Operation of Media Material Analyzer
Block Segmentation
Article Composing
Language Statistics
Layout Transition
Training Mode
    Vertical Transitions
    Horizontal Transitions
Run Mode
Display Examples
World Wide Web Application
Further Features and Advantages
Further Applications
Example Computer System Implementation
Conclusion

DETAILED DESCRIPTION OF EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Overview

The present invention relates to systems and methods for analyzing media material having a layout. Examples include, but are not limited to, media material having a layout with columns of body text. Such examples include, but are not limited to, newspapers, magazines, catalogues, brochures, pamphlets, and other types of print media.

Media Material Analyzer

Figure 1:
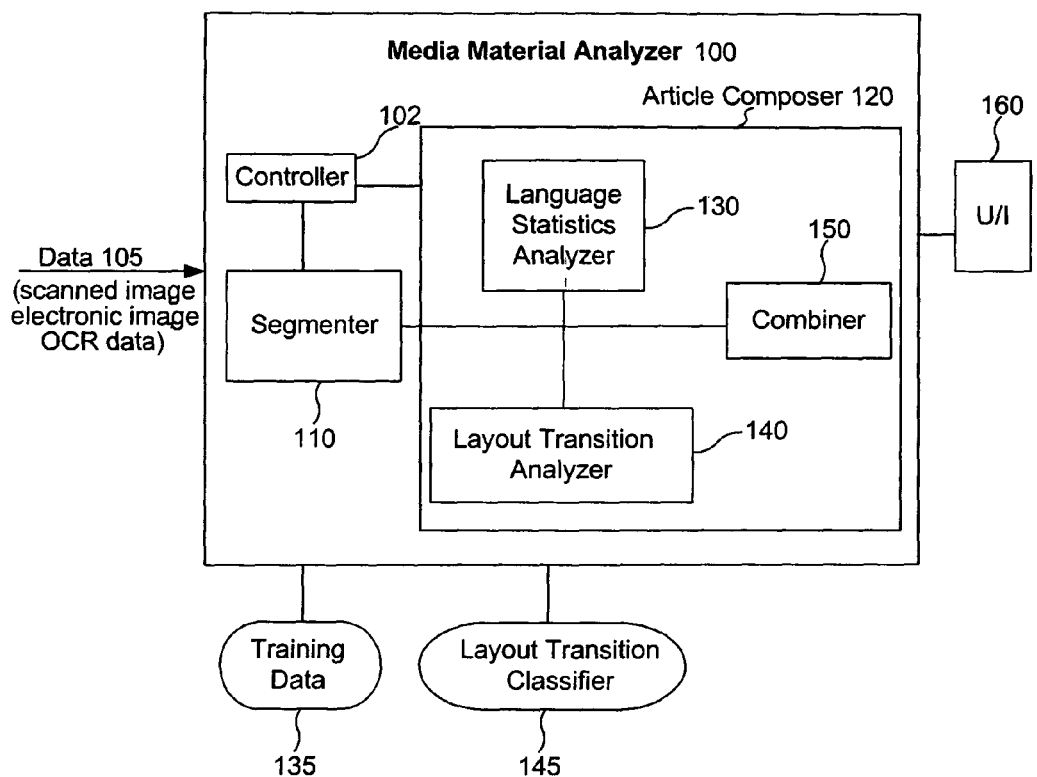
FIG. 1 is a diagram of a media material analyzer according to an embodiment of the present invention.

FIG. 1 shows a media material analyzer 100 according to an embodiment of the present invention. Media material analyzer 100 includes a controller 102, segmenter 110, and article composer 120. Article composer 120 can operate in a pure language statistics mode, pure layout transition mode, or a combination of both.

In the embodiment shown in FIG. 1, article composer 120 includes language statistic analyzer 130, layout transition analyzer 140, and combiner 150. Media material analyzer 100 can receive or access data 105, training data 135, and a layout transition classifier 145. Media material analyzer 100 can also be coupled to a user interface 160.

Data 105 can include image data of media material. Such image data can include electronic or scanned image data and optical character recognition (OCR) data extracted from image data. Data 105 can be provided in any type of file format.

Training data 135 can include positive and negative examples of block segments belonging to articles in a media material. Layout transition classifier 145 can include, but is not limited to, a data structure that contains transition feature information which allows candidate block segments to be classified as belonging to an article in a media material. Such a data structure can include, but is not limited to, a decision tree.

Segmenter 110 identifies block segments associated with columnar body text in media material in data 105. Article composer 120 determines which of the identified block segments belong to one or more articles of the media material based on language statistics information and/or layout transition information.

In an embodiment, language statistics analyzer 130 calculates language statistics for candidate block segments output by segmenter 110. Language statistics analyzer 130 then determines probabilities that candidate block segments belong to a same article based on an overlap in the language statistics information.

Layout transition analyzer 140 further analyzes layout transition features and candidate block segments output by segmenter 110. Layout transition analyzer 140 then determines whether the candidate block segments belong to a same article in the material based on the layout transition features.

Combiner 150 identifies whether the candidate block segments analyzed by language statistics analyzer 130 and layout transition analyzer 140 belong to the same article. In one example, combiner 150 identifies whether candidate block segments belong to the same article based on outputs of both the probabilities determined by language statistic analyzer 130 and the determination of whether blocks belong to the same article based on layout transition features output from layout transition analyzer 140.

Alternatively, combiner 150 can identify candidate block segments belonging to the same article based on the probabilities determined by language statistics analyzer 130 alone. Combiner 150 can also determine whether the candidate block segments belong to a same article based on the layout transition features analyzed by layout transition analyzer 140 alone.

Controller 102 controls and manages segmenter 110 and article composer 120. Further control from a user can be provided through a user interface 160. For example, a user can initiate operation or initiate input of data 105, training data 135 or layout transition classifier 145. A user may interact with media material analyzer 100 to help create or review training data 135. For example, a user can select positive and negative examples of block segments belonging to article in a given media material layout to improve the quality of training data 135. A user may also interact with media analyzer 100 to build or modify layout transition classifier 145.

Media material analyzer 100 can also display images of scanned data 105 or data output from media material analyzer 100. Output data for display can include displays of the media material analyzed to show highlighted block segments composed according to the analysis of media material analyzer 100. For certain layouts, a user can provide feedback or select highlighted block segments. Other types of information can be displayed as would be apparent to a person skilled in the art given this description.

Media material analyzer 100 (including its component modules) can be implemented in software, firmware, hardware, or any combination thereof. Media material analyzer 100 can be implemented to run on any type of processing device including, but not limited to, a computer, workstation, distributed computing system, embedded system, standalone electronic device, networked device, mobile device, set-top box, television, or other type of processor or computer system.

Media material analyzer 100 can also be used in a variety of applications. By operating automatically or semi-automatically on data 105, media material analyzer 100 can analyze stored image data, such as, archived media material. Microfiche, film and other storage media can be scanned to obtain image data for input. Electronic files in any file format can also be input. The analysis can be carried out automatically or semi-automatically with minimal or no input from a user. In this way, media material analyzer 100 can be used to compose articles made up of block segments for a variety of media. Media material analyzer 100 can then output block segments of text data that make up articles in a media material having a layout. Such output can be delivered or stored to local and remote users wishing to review or search the contents of media material.

By operating automatically or semi-automatically, a plurality of media material analyzers 100 can be used and scaled to analyze a large amount of media material. In this way, content in the media material layout can be made available locally and remotely over networks to a wide range of users. Media material analyzer 100 can allow users to review text data in media material accessed locally or remotely at libraries, universities, government agencies, businesses, and other sites. Media material analyzer 100 can be used in connection with a search engine, web portal, or other web site to allow remote users to review and search media material having layout.

The operation of media material analyzer 100 and its components, including segmenter 110 and article composer 120, will be described in further detail below with respect to a method for analyzing media material data shown in FIG. 2.

Operation of Media Material Analyzer

Figure 2:
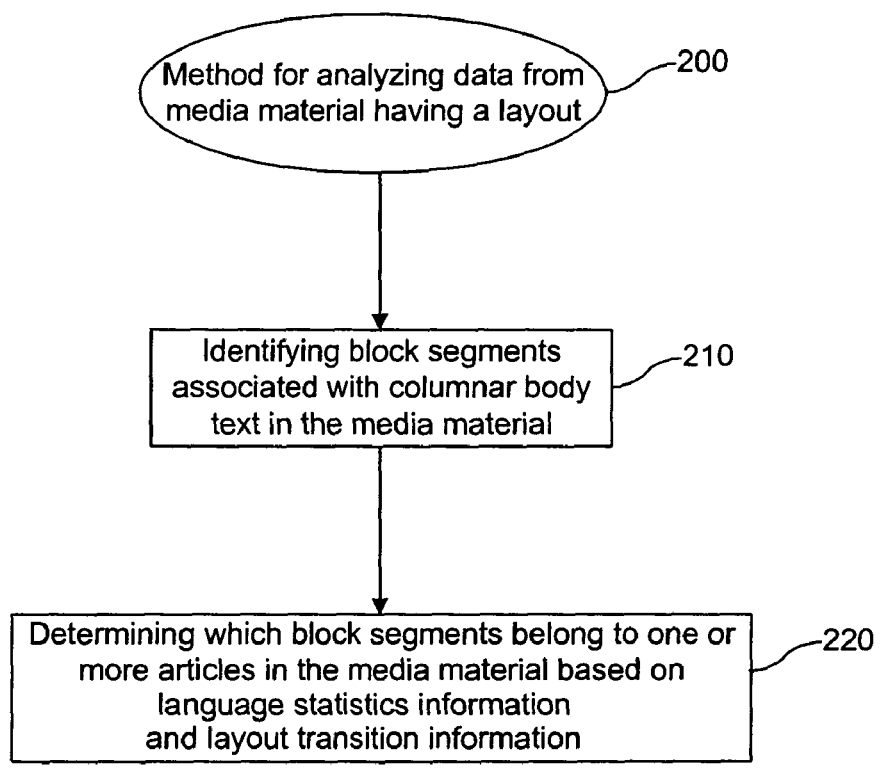
FIG. 2 is a diagram of a method for analyzing media material according to an embodiment of the present invention.

According to a further embodiment, a method for analyzing data from media material 200 is provided (FIG. 2). For brevity, method 200 will be described with reference to media material analyzer 100 but is not necessarily intended to be limited to the structure of media material analyzer 100.

Block Segmentation

Figure 3:
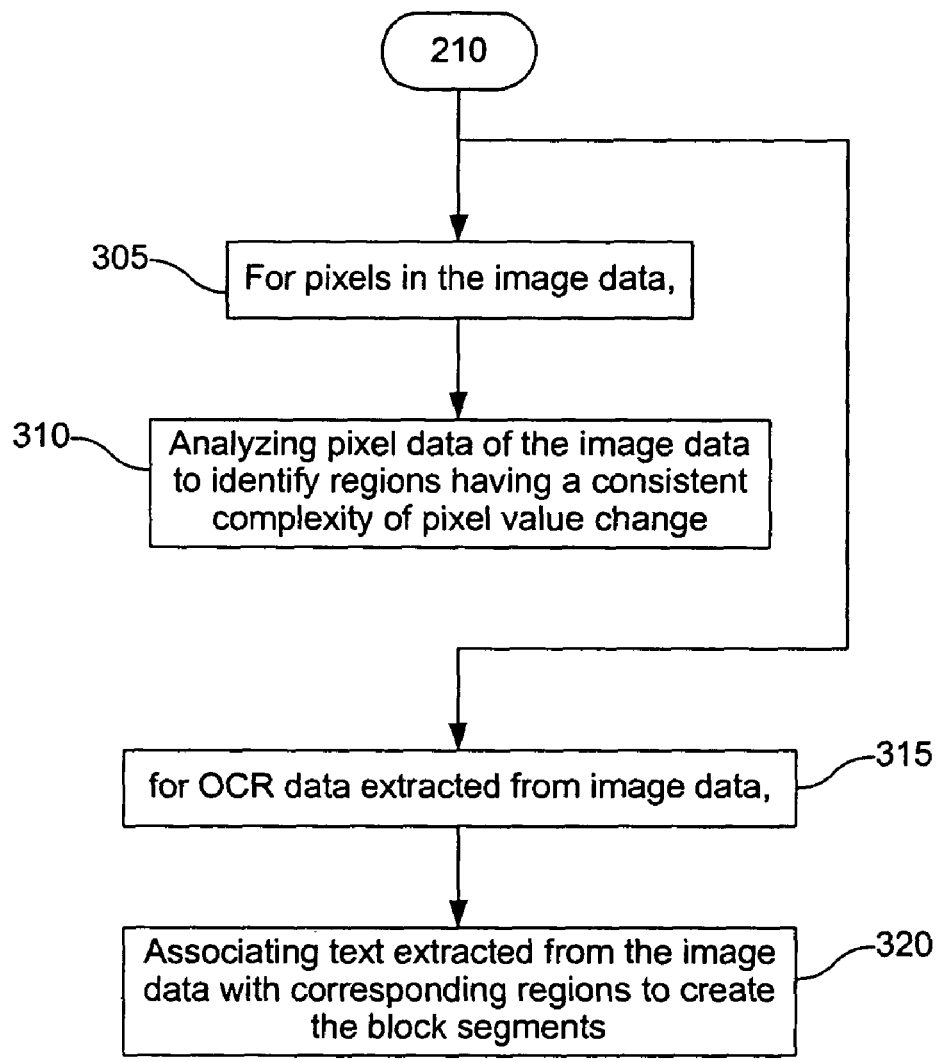
FIG. 3 is a diagram that shows an example routine for carrying out a block segment identifying step in the method of FIG. 2.
Figure 4:
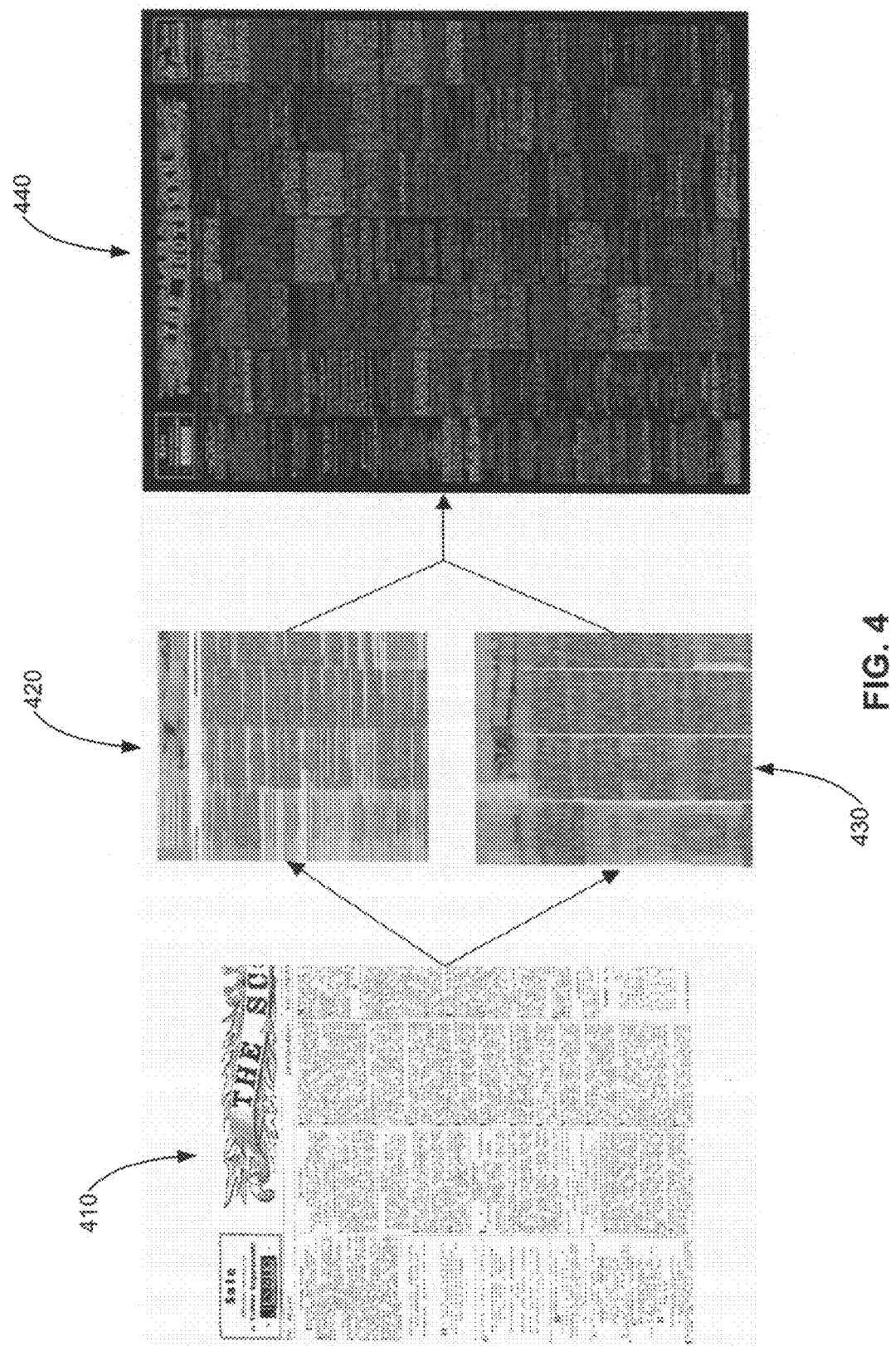
FIG. 4 is a diagram that shows images of media material with block segments identified according to the routine of FIG. 3 and includes color.

According to a feature, in step 210, block segments associated with columnar body text in the media material are identified. FIG. 3 shows in further detail an example routine for carrying out the block segmentation of step 210 (steps 305-320). For clarity, this block segmentation routine is described with respect to an example image 410 of a newspaper page as shown in FIG. 4. In this example, data 105 includes pixel data representing image 410. The pixel data is made up of pixel values representing the intensity of an image at a particular picture element (pixel) location. Pixel values can be any type of pixel value including, but not limited to, grayscale, color, binary, or other type of pixel data.

In a loop 305, segmenter 110 analyzes pixels in the image data to identify regions having similar pixel value change complexity. All of the pixels or a sample of pixels can be analyzed. Segmenter 110 analyzes pixel value changes along horizontal and vertical directions from each pixel being analyzed. These regions of similar pixel value change complexity can include block segments. In particular, for regions that cover columnar body text arranged in a layout having gutters or other borders, block segments of body text are obtained.

In one example, segmenter 110 carries out a texture method to find regions of consistent complexity in a binary (pure black and white) image. For each pixel location in the image, segmenter 110 computes the log of the distance one has to look in a horizontal direction (left and right) until the color changes n times on both sides. Regions of text will have a relatively consistent small value, while gutters and other simple regions will have a higher value. Setting n=1 gives an example run-length approach. In the example of FIG. 4, n=2 is used and results in block segments stretching horizontally across the page (see image 420). Higher values for n result in smoother regions, but also result in boundaries being cut off. The computation is repeated in the vertical direction (up and down), and when n=2 results in block segments stretching vertically along the page (see image 430). When looking for the dominant body text in article (e.g. body text in an article, rather than headlines on the page) the horizontal and vertical computations can be added together and then thresholded to obtain a final segmented image (see image 440). In a further example, when looking to distinguish regions of different size text, segmenter 110 can start with the smallest values and do a flood-fill with tolerance.

Data 105 can also include text data associated with image data of a media material layout. For example, optical character recognition (OCR) data can be provided that represents text in the media material. Alternatively, media material analyzer 100 can include an OCR module (not shown) that generates OCR data associated with scanned image data or electronic image data.

In a loop 315, for OCR text data extracted from image data, segmenter 110 associates the text data with the corresponding image regions identified as having similar pixel value change complexity in step 310. Segmenter 110 can also identify the text sizes in the text data, and in particular, can identify a body text size associated with columnar body text. In this way, block segments of text data that are candidates for belonging to an article having the body text size can be identified.

Figure 5:
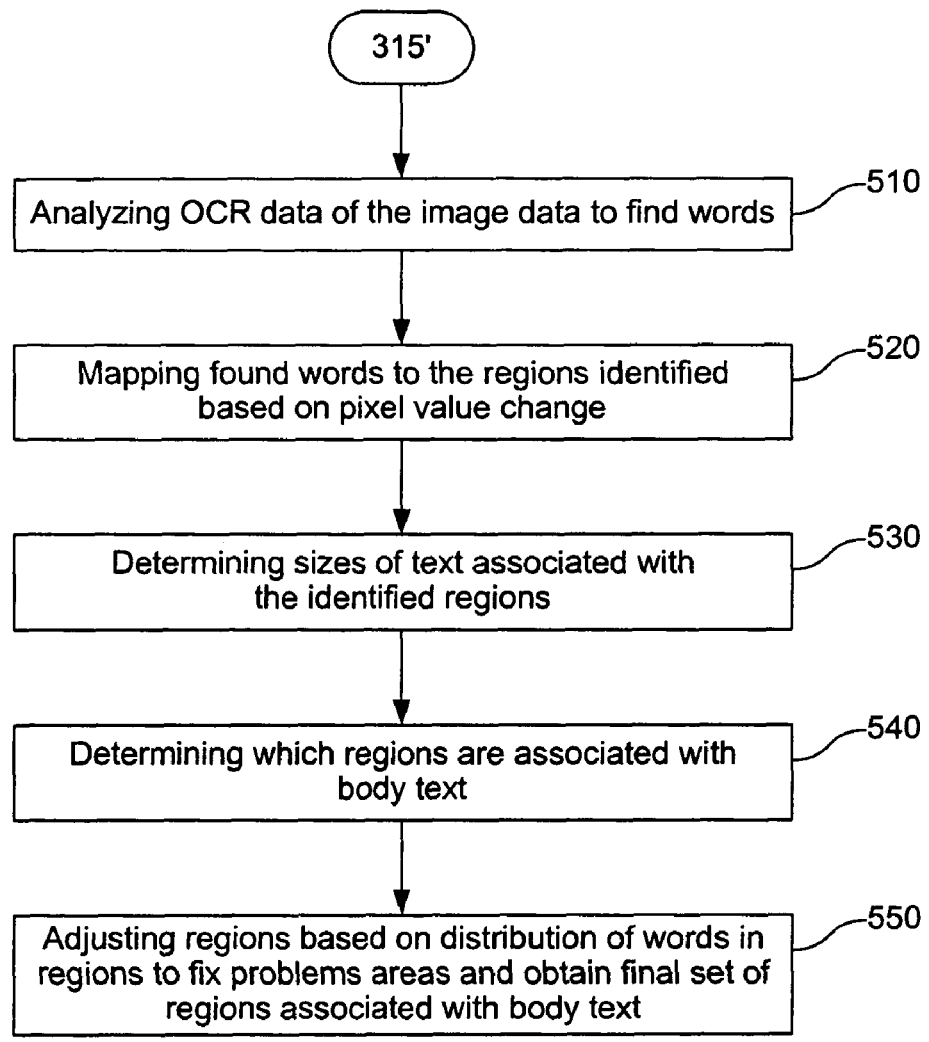
FIG. 5 is a flowchart diagram that shows a step of extracting text from OCR data and adjusting block segment regions according to a further embodiment of the present invention.
Figure 6:
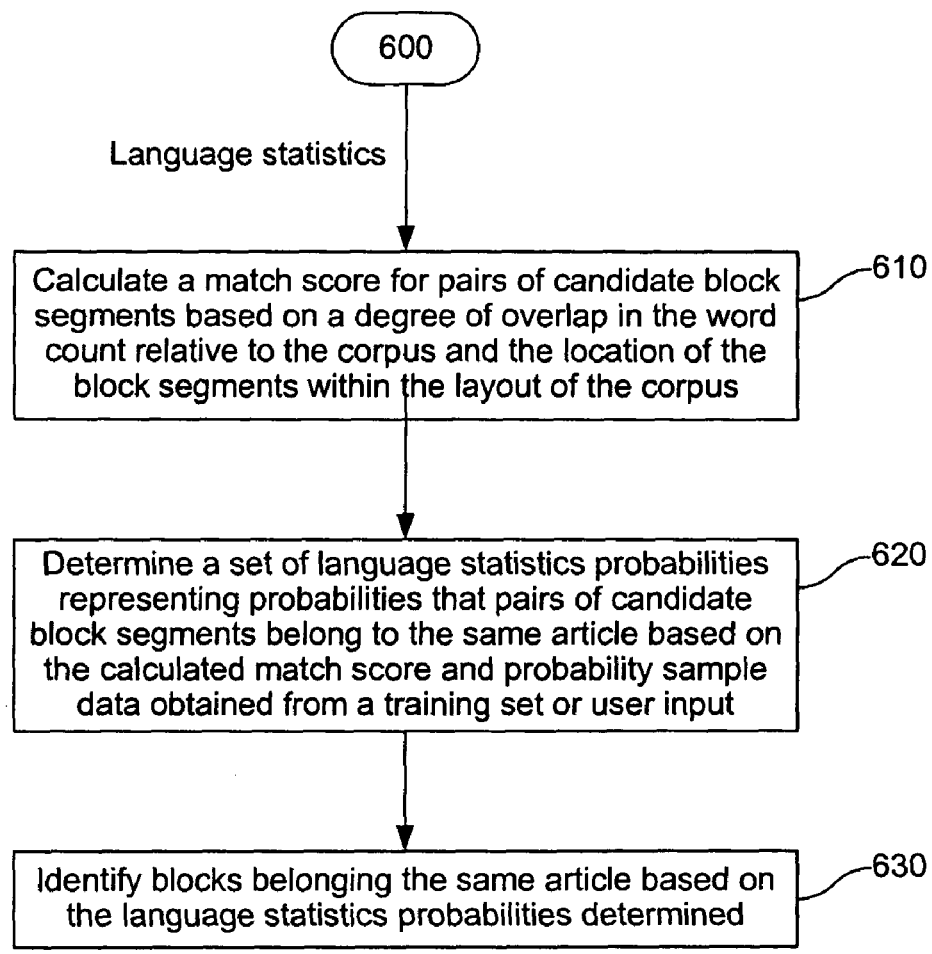
FIG. 6 is a diagram that shows a method for analyzing language statistics to identify block segments in an article according to an embodiment of the present invention.

In a further embodiment shown in FIG. 5, a loop 315' (steps 510-550) is used in place of loop 315. In step 510, segmenter 110 analyzes OCR text data extracted from the image data to find words. Segmenter 110 maps words found in the text data to an initial set of the regions identified in step 310 as having similar pixel value change complexity (step 520). Segmenter 110 determines the text sizes in the text data of the regions, and in particular, can identify a body text size associated with columnar body text (step 530). Segmenter 110 determines which regions are associated with columnar body text (step 540).

Segmenter 110 then adjusts an initial set of the regions with columnar body text (also called body segments) to obtain a final set of image regions based on the distribution of map words. When OCR segmentation is good, this adjustment can be helpful to fix problem layout areas, by looking at the distribution of values in the region found by OCR, rather than just using the pixel value change and threshold analysis.

According to a feature, segmenter 110 further associates the columnar body text data with the corresponding final set of image regions. For example, to determine which text is body text, a comparison can be done that compares the text size against a dominant text size with a given tolerance.

The segmentation based on pixel value changes is illustrative described above and not intended to necessarily limit the present invention. Other segmentation techniques known now or developed in the future may be used to segment data 105.

Article Composing

According to a feature, in step 220, article composer 120 determines which candidate block segments belong to the same article(s) based on language statistics information and layout transition information. This combination of language statistics and layout transition can improve accuracy beyond what either would achieve alone.

Language Statistics

In an embodiment, step 220 includes a routine 600 (steps 610-630). Language statistics analyzer 130 carries out routine 600. Routine 600 calculates a match score for pairs of candidate block segments output by segmenter 110. The match score is calculated according to a score function. For a particular block of text (preferably with more than 30 words) compute how frequent each word is in the block relative to the entire corpus. If the word forms X percent of the words in the article and Y percent of the words in the corpus, then the exact formula used is $\log((X/Y)+1)$. For each block, a vector of values is obtained. Using these vectors to take the cosine distance between pairs of blocks, gives a score ranging from 1 (exact match) to 0 (no overlap in words).

In step 620, language statistics analyzer 130 computes a set of language statistics probabilities that pairs of candidate block segments belong to the same article based on the calculated match score and training data 135. This training data 135 includes probability data obtained from a training set and/or user input. Such training can be carried out with same media material if available (such as, for the example of FIG. 4, image data for 1000 pages of other issues of the newspaper). Otherwise, training for language statistics purposes can be done with different media material.

For example, in step 620, given a score function between pairs of blocks (calculated in step 610), language statistics analyzer 130 computes the probability of two arbitrary blocks being from the same article. If there is access to a large collection of articles for the language, split the articles into blocks of various sizes. Use the pairs from the same article as positive examples, and pairs from separate articles as negative examples. If there is no such data, one can instead use the OCRed document itself to pick out blocks that are definitely the same article (same segmented region), and blocks that are almost definitely different (different page/issue, or far away). Given a pair of blocks with a specific word length and cosine distance, look at the similar examples and find what proportion are positive examples. Depending on the number of data points, this is improved with a kernel smoother or local regression.

Finally, in step 630, language statistics analyzer 130 identifies blocks belonging to the same article based on the probabilities determined. For example, if probability is over 50% then block segments may be identified as belonging to the same article. In one example where accuracy is relatively important, if probability is over 90% then block segments are identified as belonging to the same article. These are illustrative. Other probability thresholds can be used.

This can be automatic or semiautomatic (a semi-supervised learning task), which given some blocks of text, outputs the probability that a pair of blocks come from the same article.

The match score function and use of cosine distance and word frequencies is illustrative and not intended to limit the present invention. Other relevance techniques known now or developed in the future may be used to determine or score relevance of two blocks of text.

Layout Transition

According to a feature, layout transition analysis can be carried out in training mode or in a run mode. In an embodiment, step 220 includes a training mode routine 700 and a run mode routine 900. Layout transition analyzer 140 can operate in a training mode or a run mode. In a training mode, layout transition analyzer 140 operates over aggregated data from multiple samples of a media material to build a layout transition classifier 145. In a run mode, layout transition analyzer 140 applies a layout transition classifier 145 to data in a media material layout being analyzed.

Training Mode

Layout transition analyzer 140 carries out training mode routine 700. Layout transition analyzer 140 analyzes a layout of media material for vertical transitions (FIG. 7A, steps 710-760) and horizontal transitions (FIG. 7B, steps 770-796).

Vertical Transitions

Figure 7A:
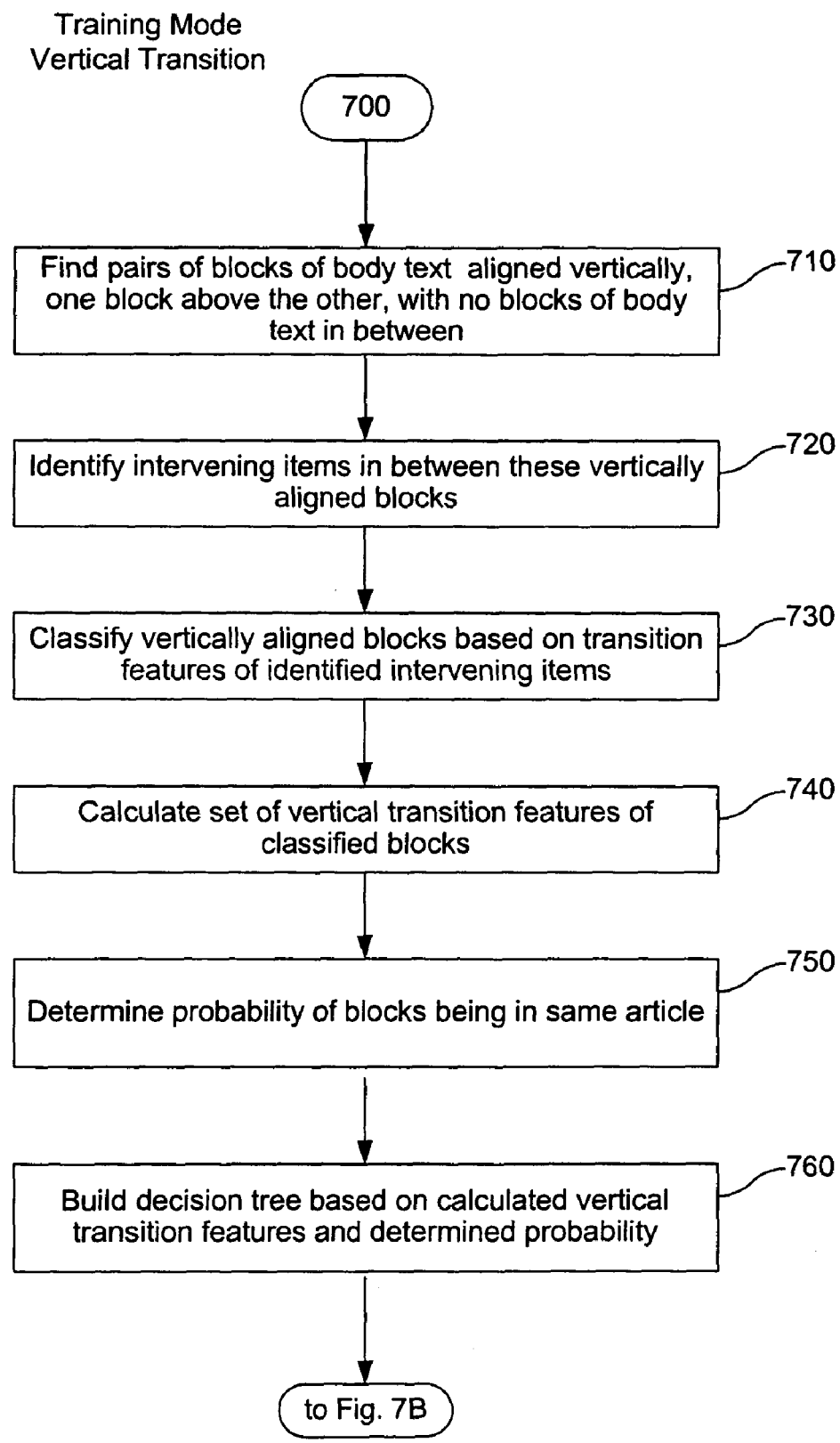
FIGS. 7A and 7B are flowchart diagrams that show the operation of a layout transition analyzer in training mode according to an embodiment of the present invention.
Figure 7B:
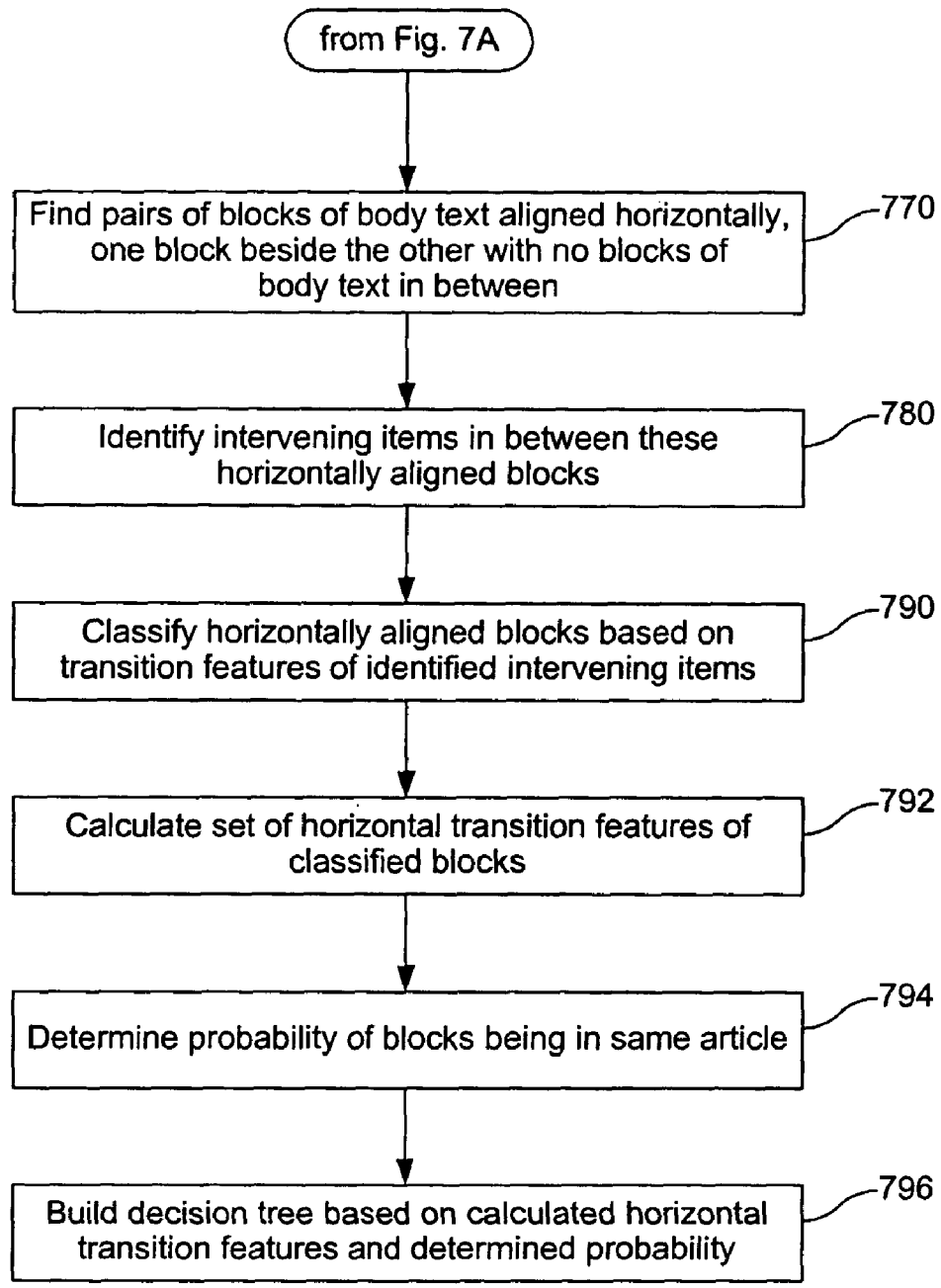
Figure 8:
FIG. 8 is an example media material showing candidate block segments that can be used for training and building a layout transition classifier according to an embodiment of the present invention.

In step 710, layout transition analyzer 140 finds pairs of block segments of body text aligned vertically, such that one block is above the other with no blocks of body text in between the vertically aligned blocks (FIG. 7A). These pairs of vertically aligned block segments can be found in the block segments output from segmenter 110. For example, in the newspaper page shown in FIG. 8, a pair of block segments 810, 830 may be identified as vertically aligned.

Intervening items located in a layout in between pairs of vertically aligned block segments are identified (step 720). The pairs of block segments are then classified based on any one or more of the intervening item(s) (step 730). For example, in the case of vertically-aligned block segments 810, 830, intervening items 820 are a horizontal rule, line of text, underline, horizontal rule, line of text, horizontal rule. One class may then be blocks separated by specific transition features of these items, such as, a horizontal rule, line of text of 16 pt, underline, horizontal rule, line of text of 24 pt, and horizontal rule.

Next, layout transition analyzer 140 calculates a set of transition features for the classified block segments (step 740). For example, in the case of block segments 810, 830 with intervening items 820, the set of transition features calculated may be the total vertical separation of blocks, how well the blocks align, width of rule relative to width of blocks, text font size, text line width relative to width of blocks, etc. In one example for newspaper layout data, a list of the vertical transition features that can be used for pairs of block segments (e.g., regions of body text of about the same average text size and located above each other also called top and bottom blocks) includes: (1) average width of the top and bottom blocks, (2) vertical distance between the top and bottom blocks, (3) difference between the widths of the top and bottom blocks as a fraction of the average width when there are blocks of non-body text in between, (4) left extent of the top and bottom blocks, (5) right extent of the top and bottom blocks, (6) top of the top and bottom blocks, (7) bottom of the top and bottom blocks, 8) distance between the top and bottom of the top and bottom blocks, (9) distance between left and right of the top and bottom blocks, (10) average font size in these top and bottom blocks, and (11) maximum font size in these top and bottom blocks.

These example vertical transition features are illustrative and not intended to limit the present invention. The exact set of transition features to be calculated depends upon the desired accuracy needed for the classifier 145 being trained and the complexity of media material. Simpler layouts may require less transition features to be calculated. More complex layouts or applications where accuracy is relatively important may warrant larger sets of transition features to be calculated. The exact set of features to be calculated can be subject to manual or automatic change. Manual changes can be carried out based on input from a user through user-interface 160.

In step 750, layout transition analyzer 140 determines probabilities of block segments being in the same articles. For each class in step 730 and set of vertical transition features, there is a number of vertical transition features which are summarized by a sequence of numbers. Also, from the output of language statistics analyzer 130 there is known a probability of the transition being part of an article.

A layout transition classifier 145, such as, a decision tree, can now be automatically formed (step 760) in order to maximize the likelihood of the partition of block segments when the segments are not in the same article. This classifier 145 can be used to decide for each vertical transition whether to merge the two vertically-aligned blocks. In this way, the vertically aligned block segments are now a collection of maximal columns and ready for analysis of horizontal transitions. This training to form layout transition classifier 145 based on vertical transition features can be carried out over an aggregation of available data, such as, multiple block segments from one or more images. In an example, not intended to limit the invention, training can be carried out over a large collection of images, such as, a 100 or more pages from different issues of a newspaper to form layout transition classifier 145.

Horizontal Transitions

In step 770, layout transition analyzer 140 finds pairs of block segments of body text aligned horizontally, such that one block is beside the other with no blocks of body text in between the horizontally aligned blocks (FIG. 7B). These pairs of horizontally aligned block segments can be found in the block segments output from segmenter 110. For example, in the newspaper page shown in FIG. 8, a pair of block segments 840, 850 may be identified as horizontally aligned.

Intervening items located in a layout in between pairs of horizontally aligned block segments are identified (step 780). The pairs of block segments are then classified based on any one or more of the intervening item(s) (step 790). For example, in the case of horizontally-aligned block segments 840, 850, the intervening item is a gutter. One class may then be blocks separated by a specific transition features of these item(s), such as, a gutter and its width.

Next, layout transition analyzer 140 calculates a set of transition features for the classified block segments (step 792). For example, in the case of block segments 840, 850 with its intervening item, the set of transition features calculated may be a gutter and its width, the total horizontal separation of blocks, how well the blocks align, etc. In one example for newspaper layout data, a list of the horizontal transition features that can be used for pairs of block segments or regions of body text of about the same average text size and located beside each other (also called left and right blocks) includes: (1) distance between right edge of right block and left edge of left block, (2) vertical alignment of tops of left and right blocks, (3) horizontal distance between left and right blocks, (4) difference between width of the two left and right blocks, and (5) relationship to nearby non-body text. Such a relationship to nearby non-body text transition feature can involve, for instance, finding the block of non-body text closest to the top of the left block and the block closest to the top of the right block, and computing for each nearby non-body text block: a vertical distance of the non-body text block from the furthest of the two left and right blocks, a vertical distance of the non-body text block from the closest of the two left and right blocks, a left extent of the non-body text block past the left block, a right extent of the non-body text block past the right block, a distance of the non-body text block from the average of the tops of the two left and right blocks, a distance of the non-body text block from the average of the bottoms of the two left and right blocks, a width of non-body text block, a height of non-body text block, a font size in non-body text block, and a number of words in the non-body text block.

These example horizontal transition features are illustrative and not intended to limit the present invention. The exact set of transition features to be calculated depends upon the desired accuracy needed for the classifier 145 being trained and the complexity of media material. Simpler layouts may require less transition features to be calculated. More complex layouts or applications where accuracy is relatively important may warrant larger sets of transition features to be calculated. The exact set of features to be calculated can be subject to manual or automatic change. Manual changes can be carried out based on input from a user through user-interface 160.

In step 794, layout transition analyzer 140 determines probabilities of block segments being in the same articles. For each class in step 790 and set of horizontal transition features, there is a number of transition features which are summarized by a sequence of numbers. Also, from the output of language statistics analyzer 130 there is known a probability of the transition being part of an article. A layout transition classifier 145, such as, a decision tree, can now be automatically formed (step 796) in order to maximize the likelihood of the partition of bock segments when the segments are not in the same article. This classifier 145 can be used to decide for each horizontal transition whether to group the two horizontally-aligned blocks in the same article. In this way, the maximal columns of block segments are further grouped horizontally when they belong to the same article. This training to form layout transition classifier 145 based on horizontal transition features can be carried out over an aggregation of available data, such as, multiple block segments from one or more images. In an example, not intended to limit the invention, training can be carried out over a large collection of images, such as, a 100 or more pages from different issues of a newspaper to form layout transition classifier 145.

One advantage is that this layout transition analysis can supplement language statistics analysis to improve the accuracy of articles being composed. The use of a classifier 145 that classifies block segments based on vertical and horizontal transition features in a layout means that even if a pair of block segments seem unrelated based on language statistics alone, but fit a pattern of several strongly related pairs, a combiner 150 can still put the pair as part of the same article. In this way, this combination of language statistics and layout transition can improve accuracy beyond what either would achieve alone.

As noted above, in some examples that inventors have run using word frequencies to assess how related two blocks of text are, the media material analysis routine 200 resulted in about a 90% accuracy in telling whether two blocks were from the same article. Media material analysis routine 200 combined these predictions over a large collection of pages, in order to find rules that are generally true. For example, if two blocks usually have unrelated text when they are separated by 16-20 pt Helvetica text, then this is likely to be an article separator.

Since this method forms an estimate of the language statistics probabilities and generates an approved set of probabilities based on layout transition features, this process can be iterated as new data is analyzed, with each run potentially adding a bit more information to improve classifier accuracy.

Once training classifier 145 is trained and built over an aggregate of data, it can be used by layout transition analyzer 140 operating in a run mode to compose articles.

Run Mode

Figure 9A:
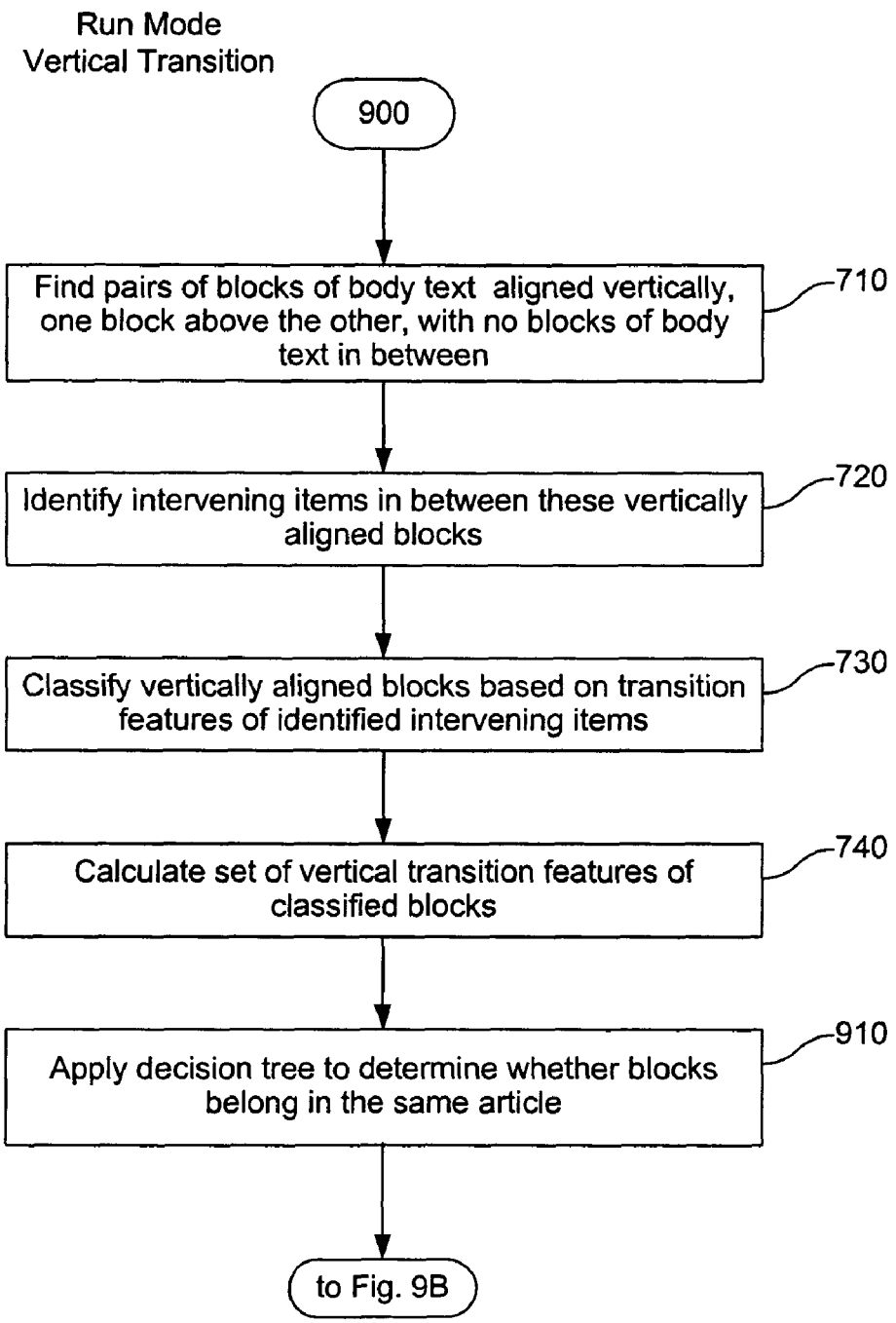
FIGS. 9A and 9B are flowchart diagrams that show the operation of layout transition analyzer in a run mode according to an embodiment of the present invention.
Figure 9B:
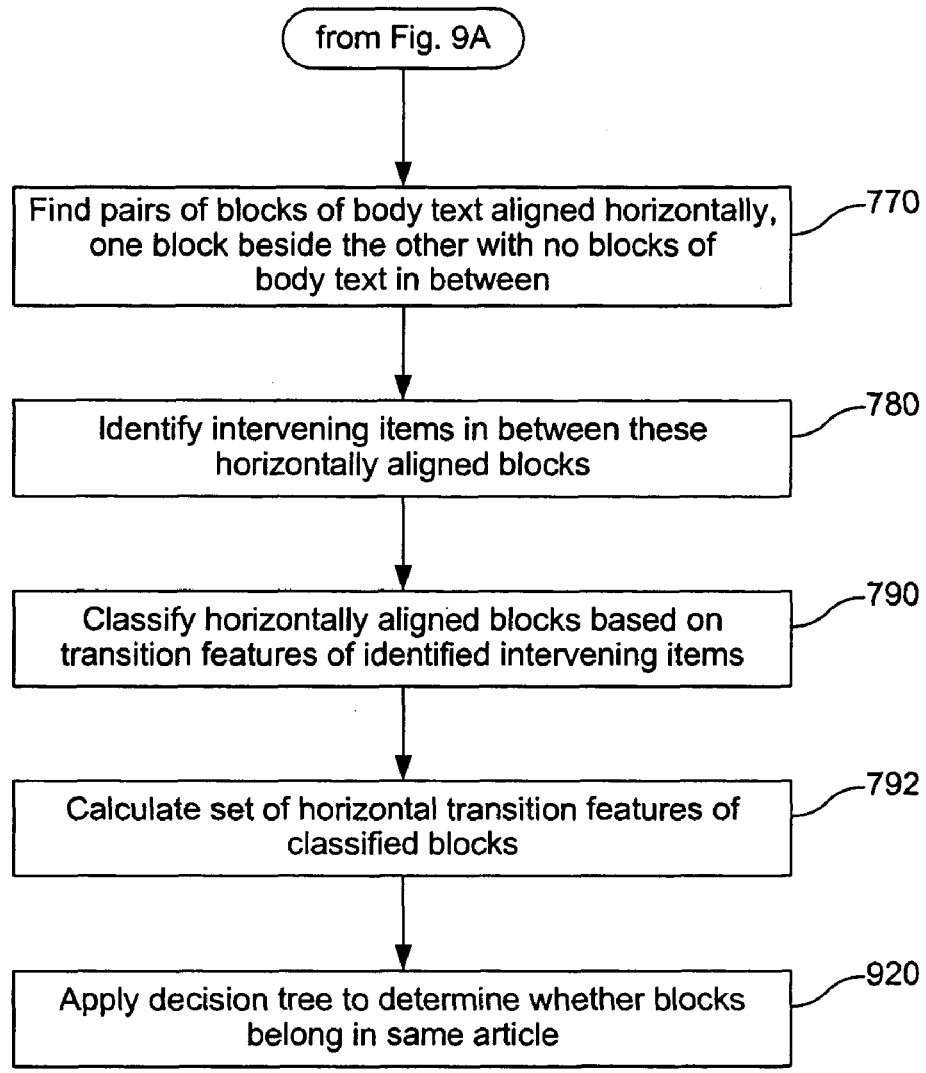

The run mode is similar to the training mode described above with respect to FIG. 7. Layout transition analyzer 140 carries out run mode routine 900. Layout transition analyzer 140 analyzes a layout of media material for vertical transitions (FIG. 9A, steps 710-740 and 910) and horizontal transitions (FIG. 9B, steps 770-792 and 920).

In run mode, layout transition analyzer 140 carries out steps 710-740 for pairs of vertically-aligned block segments as described above. Instead of building a classifier 145, layout transition analyzer 140 applies classifier 145, such as, a decision tree, to determine whether vertically-aligned block segments belong in the same article (step 910).

Similarly, in run mode, layout transition analyzer 140 carries out steps 770-792 for pairs of horizontally-aligned block segments as described above. Layout transition analyzer 140 applies classifier 145, such as, a decision tree, to determine whether horizontally-aligned block segments belong in the same article (step 920).

This division between training mode and run mode is illustrative and not necessarily intended to limit embodiments of the present invention. In another embodiment, results output during running of the media material analyzer 100 in run mode may be used to also modify a classifier 145 so that the classifier is updated periodically as new data 105 is analyzed.

The way of analyzing layout by splitting up process flow into two types of vertical and horizontal flow and then summarizing the vertical and horizontal transitions based on what they look like and what is between them, is a unique feature but not intended to limit the present invention. Alternatively, layout transition analysis can be done based on layout transition features without splitting up process flow into the two parts. Also, instead of looking at blocks of body text, one could form a tree structure for all elements on the page, and attempt to form rules for transitions between any two types of elements.

There are multiple machine learning approaches that can be used in building a classifier 145. Aside from decision tree implementations, one could also use linear separators after a basis expansion, k-means clustering, kernel smoothing methods, etc. as would be apparent to person skilled in the art given this description. Another approach is to simply make the features discrete, categorize into these buckets, and hope that each seen case has enough examples.

Display Examples

FIGS. 10A to 10D show example media material including pages of a newspaper analyzed according to embodiments of the present invention.

Figure 10A:
FIGS. 10A to 10D include color and show example media material including pages of a newspaper analyzed according to exemplary embodiments of the present invention.
Figure 10B:

FIG. 10A is a display of a front page of a newspaper analyzed by media material analyzer 100 based on language statistics analysis and layout transition analysis. Block segments including body text are highlighted in their corresponding articles to which they belong as analyzed by media material analyzer 100. Block segments corresponding to columnar body text in the same article are colored or shaded with the same color to show how the analyzer 100 segmented data and composed articles with the appropriate segments. FIG. 10B is a display of an example of an interior page of a newspaper with a relatively tricky layout analyzed by media material analyzer 100 with a layout transition classifier and layout transition analyzer.

Figure 10C:
Figure 10D:

FIGS. 10C and 10D show highlighted examples of media material analyzed based on language statistics analysis (pure language statistics mode) according to an embodiment of the present invention. FIG. 10C shows an example of a front page of a newspaper with block segments highlighted and articles on the front page. FIG. 10D shows an interior page of a newspaper with block segments highlighted in articles. While block segments in the same articles are highlighted in this example with color, the invention is not so limited. Other types of highlighting (e.g., grayscale shading, borders, texture, or other marking or indicia) may be used instead of or in addition to color. Also, highlighting may not be used if desired and just the segments of articles or portions thereof may be displayed.

World Wide Web Application

Figure 11:
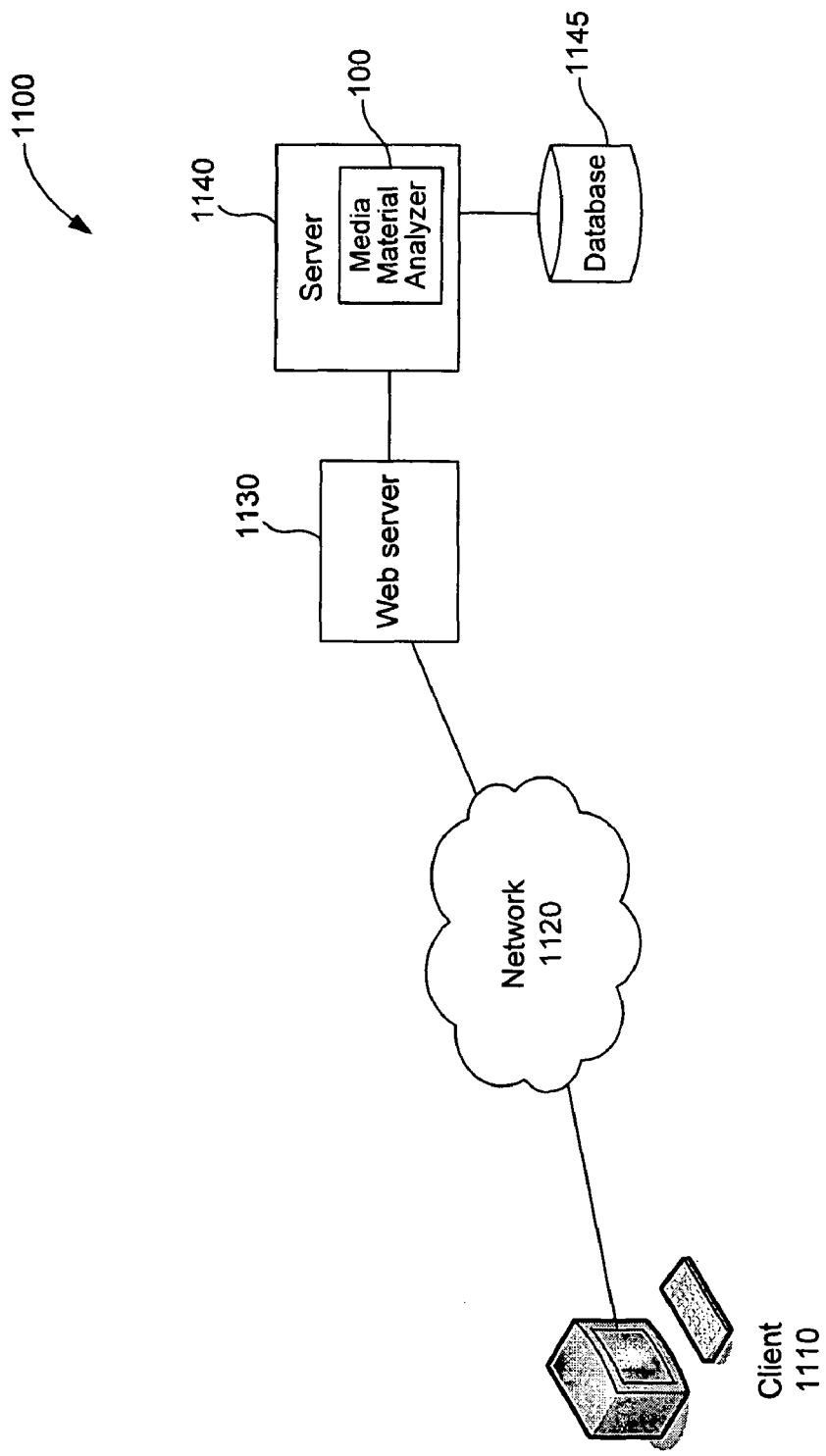
FIG. 11 is a diagram that shows a system for searching media material having a layout over the World Wide Web according to a further embodiment of the present invention.

According to a further embodiment of the present invention, a system for searching media material having a layout over the World Wide Web is provided (FIG. 11). As shown in FIG. 11, a system 1100 for searching media material includes a client 1110, web server 1130, and server 1140, and database 1145. Client 1110 is coupled to web server 1130 over a network 1120. Network 1120 can be any one or more networks of any type including, but not limited to, local area networks, medium area networks, or wide-area networks, such as, the Internet. In one example, client 1110 can include a browser that communicates over a network 1120 with web server 1130. Any type of browser can be used. Web server 1130 is coupled to server 1140.

Server 1140 includes or is coupled to media material analyzer 100 as described above. Server 1140 is also coupled to database 1145. Database 1145 can be any type of database or memory that stores data to support media material analyzer 100. Database 1145, for example, can store training data 135, layout transition classifier 145, and data 105, as described above. Database 1145 can also store any output from media material analyzer 100 including data representative of the image data itself, and with the block segments belong to articles as identified by media material analyzer 100. Of course, depending upon a particular application, indexing and other operations may be carried out so that the output data is easily retrieved to fulfill search requests or other types of data requests.

In operation a user can input a search query at client 1110. A browser at client 1110 then forwards the search query over network 1120 to web server 1130. Web server 1130 communicates with server 1140 and optionally directly with media material analyzer 100. In one embodiment, media material analyzer 100 outputs data representative of the image data itself along with metadata identifying the block segments that belong to articles. This output is stored in database 1145. Server 1140 searches the database 1145 for key words or search terms to fulfill the search request. Server 1140 then forwards back to web server 1130 results fulfilling the search request. Web server 1130 then forwards the fulfilled search results to browser at client 1110 for display. In this way, web server 1130 and server 1140 operate in tandem and can be part of any search engine, portal, or web site.

Figure 12:
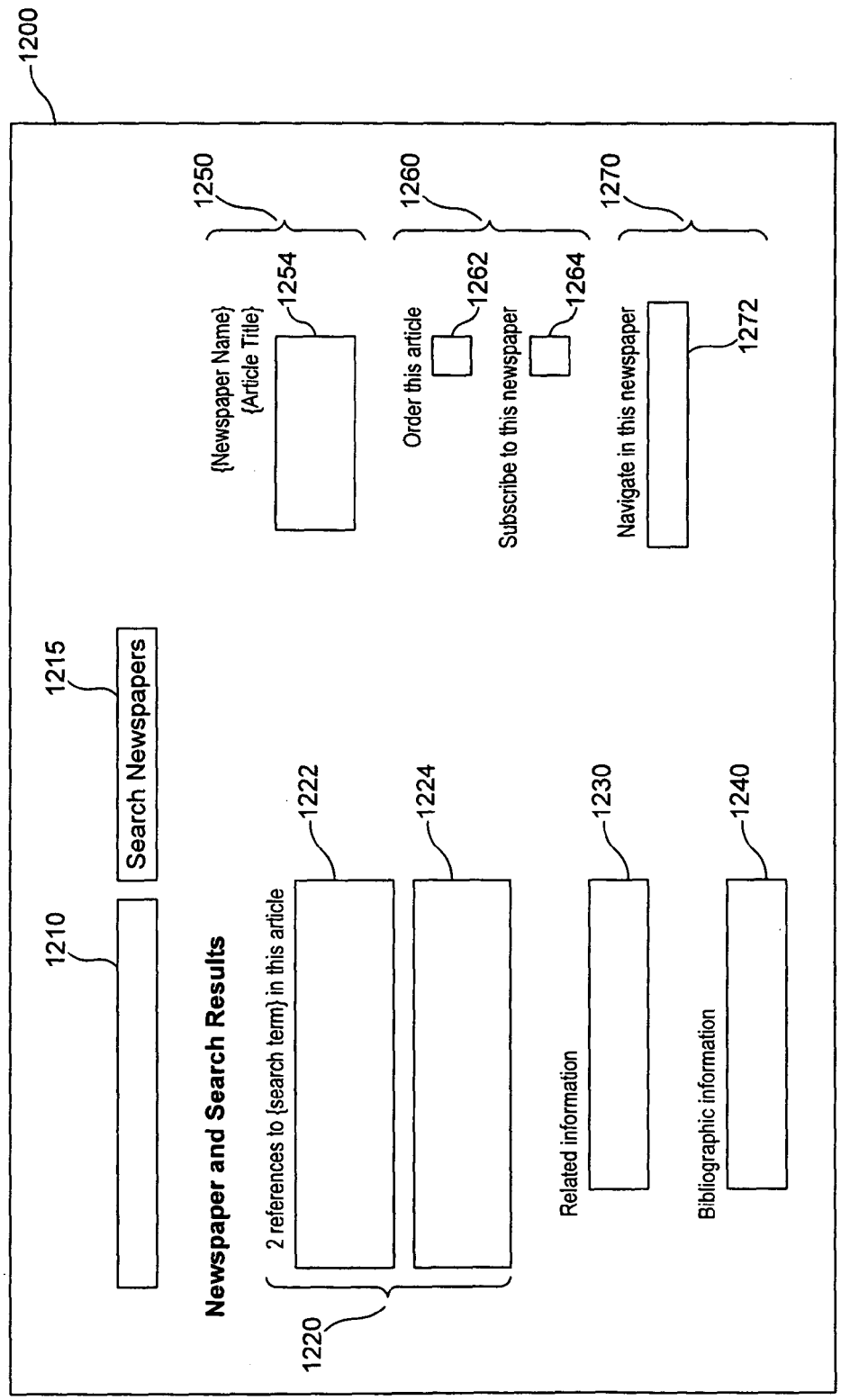
FIG. 12 is a diagram that shows an example display of search results in a search of data analyzed by a media material analyzer according to an embodiment of the present invention.

FIG. 12 shows an example display 1200 that may be used with a newspaper embodiment. As shown in display 1200, a field 1210 can be used to input search results. A button 1215 can then be selected by the user to initiate a search. A field 1220 can be used to display the output results from the search. In one embodiment, a number of windows are displayed to show search results. For example, if the search results produced a hit in article, then two snippets from the same article may be displayed in two windows 1222, 1224. These snippets may include search terms and information around search terms. This is an example only and not intended to limit the present invention. One or more snippets from one or more articles can be displayed. Further, the entire text of an article, or just the search terms therein, or snippets, such as regions surrounding the search terms, can be displayed. Any number of hits, snippets, or desired text satisfying the search can be displayed. The entire image of a page of a newspapers (or portions thereof) with highlighted block segments as shown in FIG. 10 can also be displayed.

According to a further example, other types of information can be displayed in display 1200. As shown in FIG. 12, field 1230 can be displayed to show related information. Field 1240 can be used to display bibliographic information relating to the newspaper such as publisher, day and time the newspaper was published, reporter bylines, and other information. Another field 1250 can be provided to display the article, title, and newspaper name in area 1254. Additional control fields, such as, a field 1260 can be provided to enable a user performing the search to order an article (button 1262) and subscribe to the newspaper (button 1264). Navigation controls can also be provided. For example, a navigation area 1270 can include a jump field 1272 that displays page numbers that allow a user to jump to different pages of a newspaper or to jump to different search results. Other navigational controls (not shown) can be provided to enable a user to scroll, zoom in, zoom out, or otherwise change the display of media information presented to a user.

Further Features and Advantages

Among other things, a novel approach to segmenting and analyzing the layout of scanned (or electronically produced) newspapers, as well as related material such as magazines, catalogs, etc. is provided. Clever morphology-related algorithms can decompose a page into physical blocks. Textual information (whether present in the a page or extracted via OCR) may be used decide how text blocks should be organized into articles and how the text flows. Additionally, the information gathered through text analysis of large number of pages can be used to infer collection-specific geometric rules for layout analysis.

The layout segmentation makes it possible to understand what is an article or a cohesive entity and index it as one unit (thereby improving indexing and retrieval). It will also make it possible to conveniently zoom in on articles, extract articles in context, reflow the textual information without actually presenting text, etc. In other words, it enables a powerful and convenient user experience for navigating scanned newspapers and magazines—and in fact, it also applied to electronic sources (e.g., PDF).

According to a further feature, an embodiment of media material analyzer 100 can use language statistics to learn the role of various geometric elements, and to compute rules specific to a media material such as a newspaper. Such an analyzer and method does not need any example segmentations in training data, and works purely from the language statistics determined from the image and OCR output.

Further, unlike earlier limited geometry based layout analysis of others, embodiments are provided by the inventors herein which allow language statistics drawn from text data to be used to infer article-level segmentation and to infer the geometric rules that can be used to segment particular collections of newspaper/magazine pages.

Instead of simply presenting the final guess, a media material analyzer can keep a list of best guesses for the articles, allowing a user at a user-interface to see an alternative for a part if something is wrong. The user will generally want do this until finding the option that is most easily readable. By observing what the user selects, the article composer can update the choices in real-time by modifying the probabilities, thus learning tricky areas from the user's choices.

Once the article segmentation is figured out, there are many ways to display the articles. One allows the user to select an article, at which point they get a zoomed in version of the page, allowing the user to navigate through the multiple parts of the article with the scroll wheel. Working with bounding boxes, the images of individual words can be extracted and reflowed. This can either be done through a separate page that looks like the newspaper but is easier to read, or by allowing the user to change the size of text or columns resulting in the newspaper being "regenerated" to fit the style and the parameters.

Further Applications

A technique of using the language statistics in aggregate over many pages in order to discover common rules can be used to solve several other problems. According to an embodiment, further analysis may be carried out to determine block segments in an article that continues between pages of a newspaper.

Example Computer System Implementation

Figure 13:
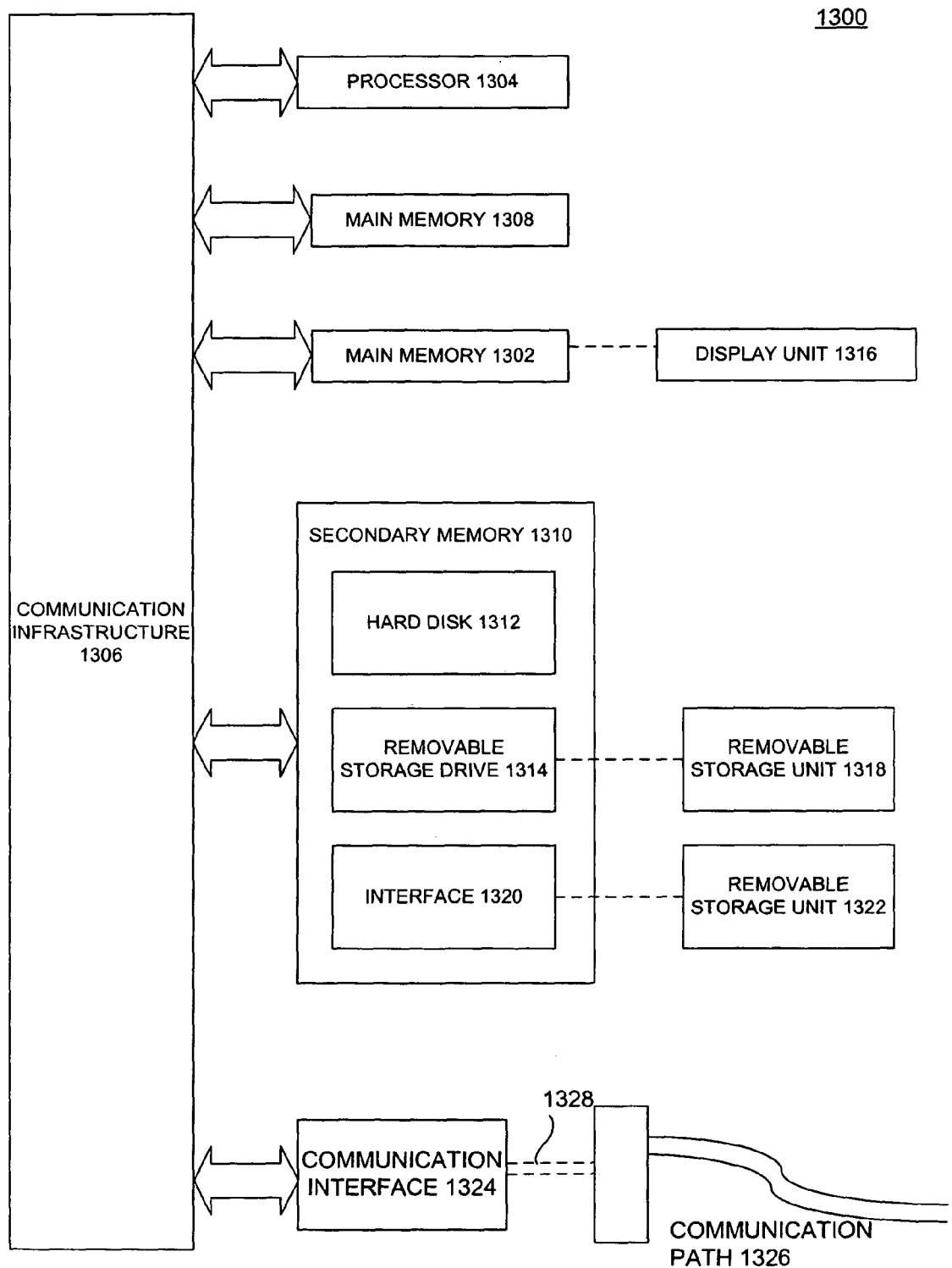
FIG. 13 is a diagram of an example computer system that can be used to implement an embodiment of the present invention.

Various aspects of the present invention can be implemented by software, firmware, hardware, or a combination thereof. FIG. 13 illustrates an example computer system 1300 in which the present invention, or portions thereof, can be implemented as computer-readable code. For example, the media material analyzer 100 carrying out method 200 of FIG. 2 can be implemented in system 1300. Various embodiments of the invention are described in terms of this example computer system 1300. After reading this description, it will become apparent to a person skilled in the relevant art how to implement the invention using other computer systems and/or computer architectures.

Computer system 1300 includes one or more processors, such as processor 1304. Processor 1304 can be a special purpose or a general purpose processor. Processor 1304 is connected to a communication infrastructure 1306 (for example, a bus or network).

Computer system 1300 also includes a main memory 1308, preferably random access memory (RAM), and may also include a secondary memory 1310. Secondary memory 1310 may include, for example, a hard disk drive 1312 and/or a removable storage drive 1314. Removable storage drive 1314 may comprise a floppy disk drive, a magnetic tape drive, an optical disk drive, a flash memory, or the like. The removable storage drive 1314 reads from and/or writes to a removable storage unit 1318 in a well known manner. Removable storage unit 1318 may comprise a floppy disk, magnetic tape, optical disk, etc. which is read by and written to by removable storage drive 1314. As will be appreciated by persons skilled in the relevant art(s), removable storage unit 1318 includes a computer usable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communications interface 1324. Communications interface 1324 allows software and data to be transferred between computer system 1300 and external devices. Communications interface 1324 may include a modem, a network interface (such as an Ethernet card), a communications port, a PCMCIA slot and card, or the like. Software and data transferred via communications interface 1324 are in the form of signals which may be electronic, electromagnetic, optical, or other signals capable of being received by communications interface 1324. These signals are provided to communications interface 1324 via a communications path 1326. Communications path 1326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1318, removable storage unit 1322, a hard disk installed in hard disk drive 1312, and signals carried over communications path 1326. Computer program medium and computer usable medium can also refer to memories, such as main memory 1308 and secondary memory 1310, which can be memory semiconductors (e.g. DRAMs, etc.). These computer program products are means for providing software to computer system 1300.

Computer programs (also called computer control logic) are stored in main memory 1308 and/or secondary memory 1310. Computer programs may also be received via communications interface 1324. Such computer programs, when executed, enable computer system 1300 to implement the present invention as discussed herein. In particular, the computer programs, when executed, enable processor 1304 to implement the processes of the present invention, such as the steps in the method illustrated by flowchart 200 of FIG. 2 discussed above. Accordingly, such computer programs represent controllers of the computer system 1300. Where the invention is implemented using software, the software may be stored in a computer program product and loaded into computer system 1300 using removable storage drive 1314, interface 1320, hard drive 1312 or communications interface 1324.

Embodiments of the invention also may be directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A computer-implemented method for analyzing data representative of media material having a layout, comprising:
   identifying block segments associated with columnar body text in the media material; and
   determining which of the identified block segments belong to one or more articles in the media material based on language statistics information and layout information,
   wherein the data representative of media material comprises pixel data of an image of the media material, and the block segment identifying includes analyzing the pixel data to identify regions having similar pixel value change complexity,
   wherein the data representative of media material further includes text data representing text in the media material, and the block segment identifying includes a step of associating the text data with corresponding image regions identified as having similar pixel value change complexity based on the location of the text data and the corresponding regions in the media material, and
   wherein the text data associating step includes:
      mapping words found in the text data to an initial set of the corresponding image regions identified as having similar pixel value change complexity; and
      adjusting the initial set of image regions to obtain a final set of image regions to the regions based on the distribution of words in the word mapping.

2. The method of claim 1, wherein the pixel data analyzing comprises analyzing pixel value changes along horizontal and vertical directions from a pixel being analyzed.

3. The method of claim 1, further comprising:
   identifying text sizes in the text data including a text size associated with a columnar body text in the media material.

4. A computer-implemented method for analyzing data representative of media material having a layout, comprising:
   identifying block segments associated with columnar body text in the media material; and
   determining which of the identified block segments belong to one or more articles in the media material based on language statistics information and layout information,
   wherein the determining includes:
      calculating language statistics for candidate block segments; and
      determining probabilities that compared block segments belong to a same article based on an overlap in language statistics information.

5. The method of claim 4, wherein the language statistics information comprises word frequency information, and the calculating includes calculating a match score for a pair of candidate block segments based on word frequencies in each block segment relative to an entire corpus and cosine distance similarity between the pair of candidate block segments.

6. The method of claim 5, wherein the determining probabilities step includes determining a probability that the pair of candidate block segments belong to the same article in the media material based on the calculated match score and sample data with predetermined positive and negative examples of block segments belonging and not belonging to a same article.

7. The method of claim 6, further comprising selecting the positive and negative data examples from a collection of articles in a training data set.

8. The method of claim 6, further comprising enabling a user to select the positive and negative data examples from a display of text data extracted through optical character recognition from an image of the media material.

9. The method of claim 4, wherein the determining further includes identifying whether the candidate block segments belong to a same article in the media material based on the probabilities determined based on the overlap in language statistics information.

10. The method of claim 4, wherein the determining further includes analyzing layout transition features in candidate block segments and determining whether the candidate block segments belong to a same article in the media material.

11. The method of claim 10, wherein the layout transition analyzing includes finding a pair of candidate block segments aligned in a vertical direction based on vertical layout transition features.

12. The method of claim 11, wherein the layout transition analyzing further includes finding another pair of candidate block segments aligned in a horizontal direction based on horizontal transition features in the layout.

13. A computer-implemented method for analyzing data representative of media material having a layout, comprising:
identifying block segments associated with columnar body text in the media material; and
determining which of the identified block segments belong to one or more articles in the media material based on language statistics information and layout information,
wherein the determining includes analyzing layout transition features in candidate block segments and determining whether the candidate block segments belong to a same article in the media material, and
wherein the layout transition analyzing includes:
calculates the layout transition features from the candidate block segments; and
applying a predetermined layout transition classifier to determine whether the candidate block segments belong to the same article in the media material based on the calculated layout transition features.

14. A computer-implemented method for analyzing data representative of media material having a layout, comprising:
identifying block segments associated with columnar body text in the media material; and
determining which of the identified block segments belong to one or more articles in the media material based on language statistics information and layout information,
wherein the determining includes analyzing layout transition features in candidate block segments and determining whether the candidate block segments belong to a same article in the media material, and
wherein the block segments comprise training data, and the layout transition analyzing includes:
calculating the layout transition features from the candidate block segments; and
building a layout transition classifier that can subsequently be used to determine whether further candidate block segments belong to a same article in the media material.

15. A computer-implemented method for analyzing data representative of media material having a layout, comprising:
identifying block segments associated with columnar body text in the media material; and
determining which of the identified block segments belong to one or more articles in the media material based on language statistics information and layout information,
wherein the article determining comprises:
calculating language statistics for candidate block segments;
determining probabilities that candidate block segments belong to a same article based on an overlap in language statistics information;
analyzing layout transition features in candidate block segments;
determining whether the candidate block segments belong to a same article in the media material; and
identifying whether the candidate block segments belong to a same article in the media material depending upon the probabilities determined based on an overlap in language statistics information and whether the candidate block segments were determined to belong to a same article in the media material.

16. The method of claim 15, further comprising displaying text from one or more block segments determined to be in the same article.

17. A media material analyzer for analyzing data representative of media material having a layout, comprising:
a segmenter that identifies block segments associated with columnar body text in the media material; and
an article composer that determines which of the identified block segments belong to one or more articles in the media material based on language statistics information and layout transition information,
wherein the data representative of media material comprises pixel data of an image of the media material, and the segmenter analyzes the pixel data to identify regions having similar pixel value change complexity,
wherein the data representative of media material further includes text data representing text in the media material, and the segmenter associates the text data with corresponding image regions identified as having similar pixel value change complexity (PVCC) based on the location of the text data and the corresponding regions in the media material, and
wherein the segmenter maps words found in the text data to an initial set of the corresponding image regions identified as having similar pixel value change complexity, and adjusts the initial set of image regions to obtain a final set of image regions based on the distribution of mapped words.

18. The media material analyzer of claim 17, wherein the segmenter analyzes pixel value changes along horizontal and vertical directions from a pixel being analyzed.

19. The media material analyzer of claim 17, wherein the segmenter further identifies text sizes in the text data including a text size associated with a columnar body text in the media material.

20. The media material analyzer of claim 17, wherein the article composer includes a layout transition analyzer that analyzes layout transition features in candidate block segments output by the segmenter and determines whether the candidate block segments belong to a same article in the media material.

21. The media material analyzer of claim 20, wherein the layout transition analyzer finds a pair of candidate block segments aligned in a vertical direction based on vertical layout transition features and determines whether the pair of candidate block segments belong to a same article in the media material.

22. The media material analyzer of claim 21, wherein the layout transition analyzer finds another pair of candidate block segments aligned in a horizontal direction based on horizontal transition features in the layout to determine whether the another pair of candidate block segments belong to a same article in the media material.

23. A media material analyzer for analyzing data representative of media material having a layout, comprising:
a segmenter that identifies block segments associated with columnar body text in the media material; and
an article composer that determines which of the identified block segments belong to one or more articles in the media material based on language statistics information and layout transition information,
wherein the article composer includes a language statistics analyzer that calculates language statistics for candidate block segments output by the segmenter, and determines probabilities that candidate block segments belong to a same article based on an overlap in language statistics information.

24. The media material analyzer of claim 23, wherein the language statistics information comprises word frequency information, and wherein the language statistics analyzer calculates a match score for a pair of candidate block segments based on word frequencies in each block segment relative to an entire corpus and a cosine distance similarity between the pair of candidate block segments.

25. The media material analyzer of claim 23, wherein the language statistics analyzer determines a probability that the pair of candidate block segments belong to the same article in the media material based on the calculated match score and sample data with predetermined positive and negative examples of block segments belonging and not belonging to a same article.

26. The media material analyzer of claim 25, wherein the language statistics analyzer automatically selects the positive and negative data examples from a collection of articles in a training data set.

27. The media material analyzer of claim 25, wherein the predetermined positive and negative data examples are selected by a user at user-interface from a display of text data extracted through optical character recognition from an image of the media material.

28. The media material analyzer of claim 23, wherein the article composer further includes a combiner that identifies whether the candidate block segments belong to a same article in the media material based on the probabilities determined by the language statistics analyzer.

29. A media material analyzer for analyzing data representative of media material having a layout, comprising:
a segmenter that identifies block segments associated with columnar body text in the media material; and
an article composer that determines which of the identified block segments belong to one or more articles in the media material based on language statistics information and layout transition information,
wherein the article composer includes a layout transition analyzer that analyzes layout transition features in candidate block segments output by the segmenter and determines whether the candidate block segments belong to a same article in the media material, and
wherein the layout transition analyzer calculates the layout transition features from the candidate block segments, and applies a predetermined layout transition classifier to determine whether the candidate block segments belong to the same article in the media material based on the calculated layout transition features.

30. A media material analyzer for analyzing data representative of media material having a layout, comprising:
a segmenter that identifies block segments associated with columnar body text in the media material; and
an article composer that determines which of the identified block segments belong to one or more articles in the media material based on language statistics information and layout transition information,
wherein the article composer includes a layout transition analyzer that analyzes layout transition features in candidate block segments output by the segmenter and determines whether the candidate block segments belong to a same article in the media material, and
wherein the block segments comprise training data, and the layout transition analyzer calculates the layout transition features from the candidate block segments, and builds a layout transition classifier that can subsequently be used to determine whether further candidate block segments belong to a same article in the media material.

31. The media material analyzer of claim 30, further comprising:
training data includes labels indicating whether blocks of text belong to the same article.

32. A media material analyzer for analyzing data representative of media material having a layout, comprising:
a segmenter that identifies block segments associated with columnar body text in the media material; and
an article composer that determines which of the identified block segments belong to one or more articles in the media material based on language statistics information and layout transition information,
wherein the article composer comprises:
a language statistics analyzer that calculates language statistics for candidate block segments output by the segmenter and determines probabilities that candidate block segments belong to a same article based on an overlap in language statistics information;
a layout transition analyzer that analyzes layout transition features in candidate block segments output by the segmenter and determines whether the candidate block segments belong to a same article in the media material; and
a combiner that identifies whether the candidate block segments belong to a same article in the media material depending upon the probabilities determined by the language statistics analyzer and whether the candidate block segments belong to a same article in the media material according to the layout transition analyzer.

33. A media material analyzer for analyzing data representative of media material having a layout, comprising:
a segmenter that identifies block segments associated with columnar body text in the media material; and
a language statistics analyzer that calculates language statistics for candidate block segments output by the segmenter and determines probabilities that candidate block segments belong to a same article based on an overlap in language statistics information.

* * * * *